US005300729A

United States Patent [19]

Tokunaga et al.

[11] Patent Number: 5,300,729

[45] Date of Patent: Apr. 5, 1994

[54] ELECTRONIC MUSICAL INSTRUMENT HAVING OPERATOR WITH SELECTIVE CONTROL FUNCTION

[75] Inventors: Shoji Tokunaga; Harada Minoru, both of Hamamatsu, Japan

[73] Assignee: Yamaha Corporation, Hamamatsu, Japan

[21] Appl. No.: 540,589

[22] Filed: Jun. 19, 1990

[30] Foreign Application Priority Data

| | | | |
|---|---|---|---|
| Jun. 19, 1989 | [JP] | Japan | 1-156481 |
| Jun. 19, 1989 | [JP] | Japan | 1-156482 |
| Jun. 19, 1989 | [JP] | Japan | 1-156483 |

[51] Int. Cl.⁵ ........................ G10H 5/00; H02M 1/00

[52] U.S. Cl. ........................ 84/657; 84/653; 84/619; 84/735; 84/743

[58] Field of Search ........................ 84/600-602, 84/615, 619, 626, 629, 647, 653, 657-659, 662, 445, 670, 723, 735, 743

[56] References Cited

U.S. PATENT DOCUMENTS

| | | | |
|---|---|---|---|
| 4,178,821 | 12/1979 | Gallina et al. | 84/445 X |
| 4,203,338 | 5/1980 | Vidas | 84/445 X |
| 4,813,327 | 3/1989 | Abe . | |
| 4,909,116 | 3/1990 | Tanaka et al. | 84/692 |
| 4,919,032 | 4/1990 | Sakashita | 84/653 |
| 4,920,850 | 5/1990 | Matsumoto et al. | 84/622 |
| 4,957,032 | 9/1990 | Hirano et al. | 84/622 |
| 5,078,040 | 1/1992 | Shibukawa | 84/619 |
| 5,083,493 | 1/1992 | Heo | 84/619 |

*Primary Examiner*—William M. Shoop, Jr.
*Assistant Examiner*—Jeffrey W. Donels
*Attorney, Agent, or Firm*—Graham & James

[57] ABSTRACT

An electronic musical instrument is provided with an operator and a function switch, adding to a controller having a shape similar to that of woodwind instrument and a tone source unit. The function switch selects a function such as a controll function of a musical tone parameter, or a musical play expression to be assigned to the operator such as a wheel switch or a foot switch. The operator performs the function assigned by the function switch during playing. Player can widen range of playing by selecting proper function and play effectively with the proper music play expression.

14 Claims, 14 Drawing Sheets

ELECTRONIC MUSICAL INSTRUMENT HAVING OPERATOR WITH SELECTIVE CONTROL FUNCTION

BACKGROUND OF THE INVENTION

1. Field of the Invention

This invention relates to an electronic musical instrument, for example wind instrument type, which is provided with playing keys and musical tone signal generating means and is capable of assigning any musical tone parameter to a continuous operator such as wheel switch, wheel assigning any musical play expression to a control means such as a foot switch or transposing the scale of a musical tone signal by an interval of a fifth at a time.

2. Description of the Prior Art

At present some electronic musical instruments have a controller which shapes the wind type instrument such as clarinet. The musical instruments are designed to control the musical tones by fingering and breath intensity control which are similar to those of the wind type instrument. Since the electronic musical instrument is designed so that the musical tone parameter is generated based on the information detected according to breath intensity and fingering and the musical tone is generated by controlling the musical tone source unit according to this musical tone parameter, it is possible to provide a free playing element (operator) which is not provided in the natural wind instrument. One example is a wheel switch which has been used until now. The wheel switch is an operator capable of outputting analog control data according to rotation angle. The existing electronic musical instruments have applied this wheel switch for pitch bend function (a control function which controls an effect to raise or lower continuously the pitch from a specified pitch).

In addition to pitch bend, there are other many musical tone parameters which could afford rich expression of musical tone by generating them based on analog data with the aid of a wheel switch. For example, it is desirable to control continuously a the tone generation effect such as vibrato from 0 level up to a maximum level.

However, as the function of the wheel switch of existing musical instruments is restricted to the pitch bend function, depth of vibrato cannot be changed. If the function of the wheel switch is fixed to adjust the vibrato function (a control function which controls a vibrato), pitch bend cannot be applied sufficiently. Accordingly, the existing electronic music instruments have a disadvantage that they cannot sufficiently express musical tones.

Some electronic musical instruments are provided with an operation means which can be operated during playing in addition to the playing keys and breath sensor so as to improve their musical expression ability. One example is a foot switch. Musical expression effects (for example, portamento and tone color change) which cannot be expressed by using only the play keys or breath sensor can be given to musical tones.

Nevertheless, since the existing musical instrument features that one function is inflexibly assigned to one operation means, many control means are required to give many musical expressions, which results in complicated play.

Usually, the electronic musical instrument has a disadvantage that since it is provided with one or two operation means mentioned above, the range of musical expression is narrow.

Usually the electronic musical instrument is tuned to C major. However, so as to ensure easy ensemble with other musical instruments and play for transposing instrument many electronic musical instruments are designed to be able to transpose. Transposition is a function to generate tones of another key (another pitch) with the same fingering. For example, if the musical instrument which is tuned usually to C major is transposed upward by 4 degrees, it can play F major by ordinary fingering.

The majority of wind instruments are transposing instruments. Therefore, when C major music is played with this type of musical instrument, actually played music may be B flat major or E flat major. Therefore so as to play this music easily with the electronic musical instrument, it is necessary to transpose its scale to the scale of a specific musical instrument. In many cases the scale of wind instruments is adjusted by increasing or decreasing the key signature ♭(♯) such as F major-B flat major-E flat major. For example, some saxophones are tuned to B flat major, but others to E flat major, some clarinets are tuned to B flat major, but others to E flat major, and some horns are tuned to F major, but others to B flat major. Thus in most cases instrument transposition is executed with a 5 degree step.

However, the conventional electronic musical instrument is designed so that transposition is executed with a semitone step. Therefore, transposition from C major to F major needs the procedure of C—C♯—D—D♯—E—F, which makes it impossible to transpose quickly during playing.

SUMMARY OF THE INVENTION

It is therefore an object of the present invention to provide an electronic musical instrument including a wind type controller in which the above-mentioned problems are solved by providing a possibility of selecting the function of an operator such as a wheel switch.

Another object of the invention is to provide an electronic musical instrument including a wind type controller in which the above-mentioned problems are solved by assigning single music playing expressions which are selected by a function switch to a single operator during playing.

A further object of this invention is to provide an electronic musical instrument in which the above-mentioned problems are solved by providing a possibility of transposing up and down with a 5-degree step by transposition operation.

This electronic musical instrument of this invention has a capability of selection of assigned functions to an operator such as the wheel switch or foot switch.

For example, the electronic musical instrument of this invention is designed so that the musical tone parameter generated according to the operation of operators such as the wheel switch can be selected with the aid of a function switch. A function switch can be operated by a player. Consequently, the player can control various musical tone parameters, using the wheel switch or the like, which allows the range of play to be widened. If the above-mentioned function switch can be operated during play, it is possible to change the musical tone parameter controlled by the wheel switch or the like.

The electronic musical instrument of this invention is designed so that one of musical play expression functions can be assigned to one operator. Moreover this assignment can be performed by operating the function switch during playing. For example, if the operator comprises a foot switch and the function switch comprises several Keys, (hand switches,) the function of the foot switch can be assigned with a proper timing to the key hold function (a control function to generate continuously the once specified pitch) or the program change function (a control function to change the tone color and effect), and the pertinent function can be used by turning on the foot switch with a timing at a moment just when it is required. Thereby musical play expression can be given effectively with a proper timing by simple operation, which enhances greatly the expression ability of the electronic musical instrument.

The electronic musical instrument of this invention features that the instrument has a first mode in which the scale of the instrument can be transposed up with a step of 5 degrees and a second mode in which the scale of instrument can be transposed down with a step of 5 degrees, and each of the two modes can be assigned to the operator. In the case when the reference scale is C (C major), transposition is executed in the procedure of C→G→D→A→E→B→ in the first mode, and the transposition is executed in the procedure of C→F→Bb→Eb→Ab→Db→ in the second mode. In the case when the reference scale is B, transposition is executed in the procedure of B→E→A→D→G→C in the second mode. Furthermore it is designed so that when the scale deviates from the reference scale by more than a half-octave as a result of transposition an octave shift is performed to set the deviation within a half-octave. For example, if the result of transposition from C3 is G3, deviation between the transposed scale and the reference scale is 5 degrees. If octave scale is lowered down to G2, the deviation from C3 is 4 degrees, namely within a half-octave. Similarly, when the scale is lowered excessively due to transposition, the deviation from the reference scale can be set within a half-octave. As a result of this transposition, a scale corresponding to a to the scale of real natural instrument is possible, instrument operation becomes easier, and the player can transpose quickly during playing. Moreover, excess scale deviation does not occur in the case of transposition, which eases play. Furthermore, semitone transposition is also possible. Therefore any transposition can be executed at once.

BRIEF DESCRIPTION OF THE DRAWINGS

FIGS. 7(A)-1, 7(A)-2, (C) are flow charts showing the operations of the control section.

DESCRIPTION OF THE PREFERRED EMBODIMENT

Figure 1A:
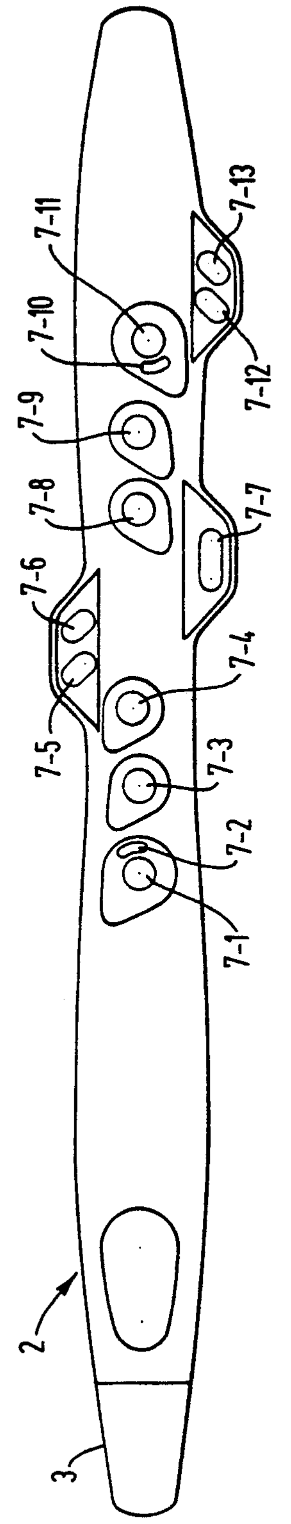
FIGS. 1 (A) and (B) show an appearance of a controller of an electronic wind instrument which is an embodiment of the invention.
Figure 1B:
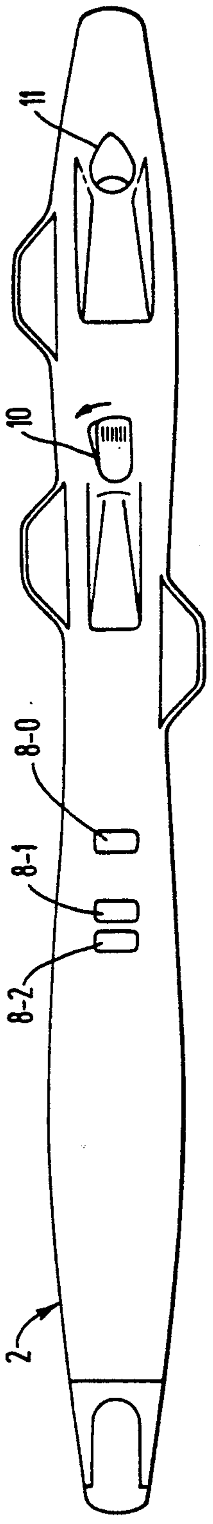
Figures 1, 7A:
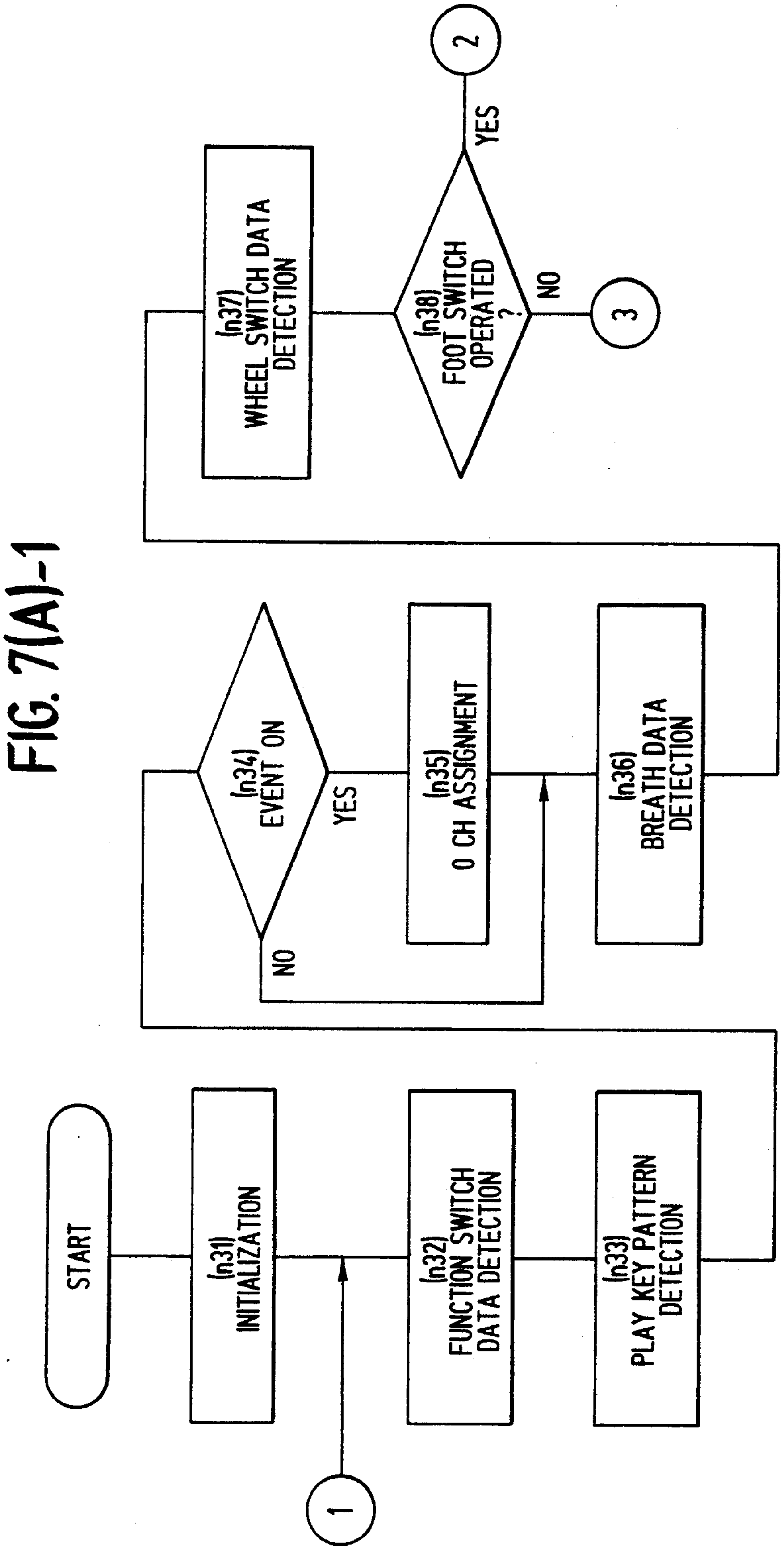
Figures 2, 7A:
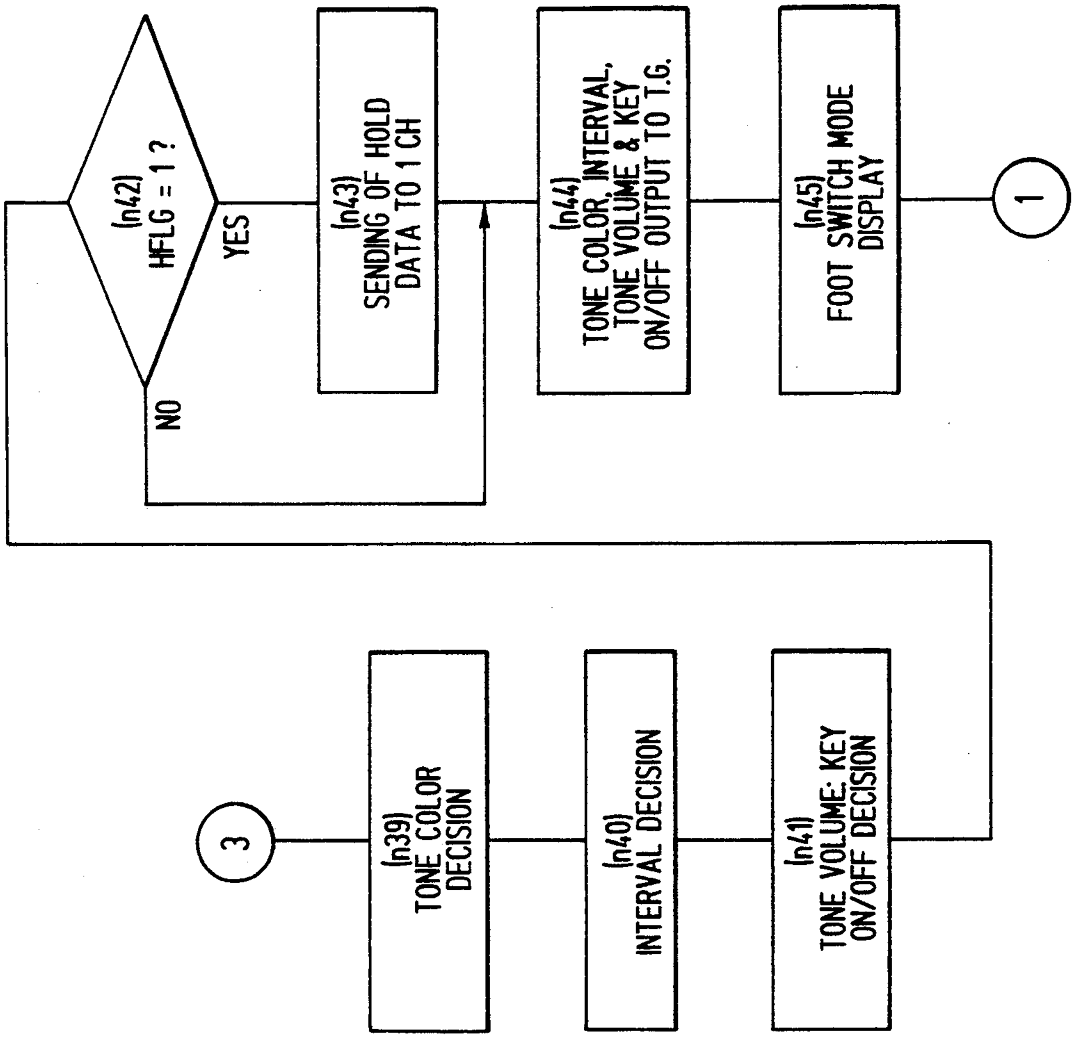

FIGS. 1 (A) and (B) show an appearance of a controller 2 of an electronic wind instrument which is an embodiment of this invention. FIG. 1 (A) is a front view, whereas FIG. 1 (B) is a rear view. This electronic wind instrument includes the controller 2 which has a shape similar to that of a woodwind instrument as shown in FIG. 1(A) and FIG. 1(B). The instrument is played by a style of playing in which the body is held by both hands and the player's mouth is touched to a part of the body (the top of the body in this embodiment). The instrument has also a tone source unit 1 which generates the musical tones (see FIG. 2). They are a connected to each other with connector cable.

In FIGS. 1 (A) and (B) the controller 2 has a shape similar to that of a woodwind instrument such as soprano saxophone. A mouthpiece 3 is provided at its front end. The player holds the mouthpiece in his mouth and blows breath into it to play the instrument. A breath sensor 21 (see FIG. 2) is provided in the mouthpiece 3. The breath sensor 21 detects the intensity (breath intensity) of the blowing in of breath. At the external side the instrument is provided with pitch keys 7 (7-1 to 7-13) designated to set the interval of the musical tone to be generated in an octave and octave keys 8 (8-0 to 8-2) designated to set the octave of the musical tone to be generated. These pitch keys 7 and octave keys 8 compose the play keys. The play keys enable the player to set the pitch by fingering (key pattern) similar to that of a saxophone. At the rear side of controller 2 a wheel switch 10 is provided. The wheel switch 10 is an operator which can be turned at a specific angle in the arrow direction in the figure. It is operated by the thumb of the right hand. The turn angle of this wheel switch 10 is detected by a permanent magnet and a hall element. Namely, the permanent magnet is provided in the wheel switch 10, and the hall element is provided in the main body of controller, opposite to the permanent magnet. When the wheel switch 10 is turned, the distance between the permanent magnet and the hall element changes, resulting in a change of resistance of the hall element, and consequently resistance of the hall element changes, so that the turn angle of wheel switch 10 is electrically detected. A connector opening 11 is provided at the lower part of rear side of controller 2.

Figure 2:
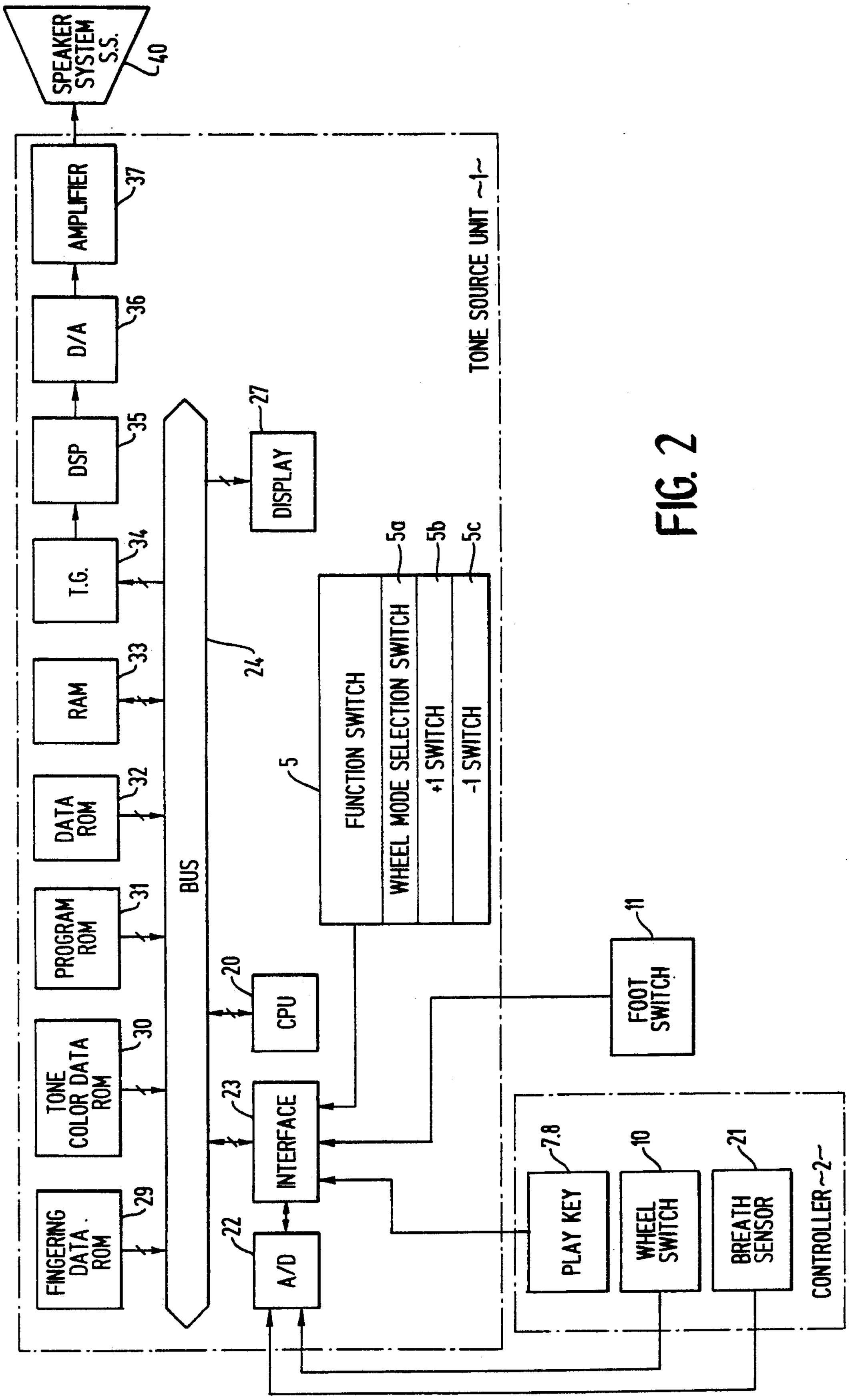
FIG. 2 is a block diagram of the control section of the electronic wind instrument.
Figure 3:
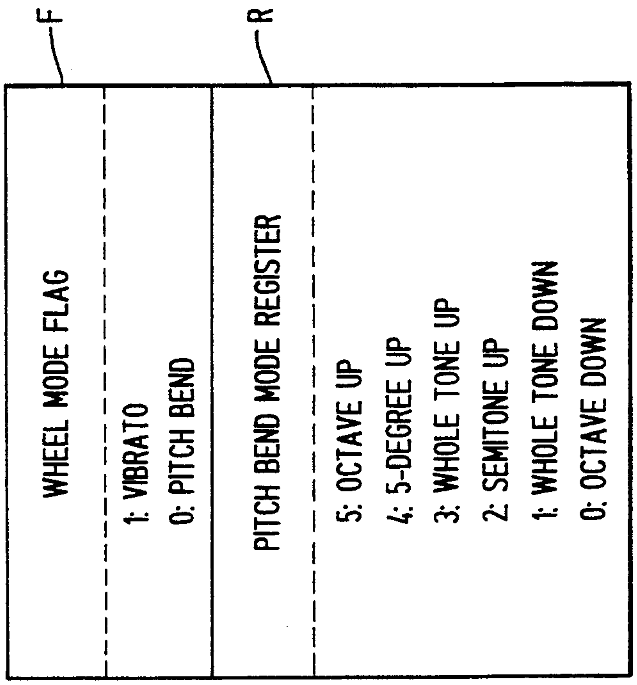
FIG. 3 shows partial configuration of RAM of the control section.

FIG. 2 is a block diagram of control section of this electronic wind instrument. This electronic wind instrument comprises the controller 2 shown in FIG. 1 and the tone source unit 1 which is connected to the controller 2 with the connector cable. Musical tone signals generated by the tone source unit 1 are inputted into a speaker system 40 and then outputted as sound (musical tone).

The tone source unit 1 is controlled by CPU 20. CPU 20 is connected to pertinent operating section through bus 24. An interface 23, a fingering data ROM 29, a tone color data ROM 33, a program ROM 31, a data ROM 32, a RAM 33, a tone generator 34 and a display 27 are connected to the bus 24. The controller 2 is connected to the interface 23 through an A/D converting circuit 22. A foot switch 11 and a function switch 5 are also connected to the interface 23. From the controller 2 the outputs of breath sensor 21, wheel switch 10 and play keys 7 and 8 are inputted as operation data signals. The function switch 5 incorporates a wheel mode selection switch 5*a*, a+1 switch 5*b*, a−1 switch 5*c* and tone color setting switch. The musical tone signal of audible frequency which is generated by the tone generator 34 is outputted to the speaker system 40 through an effect circuit 35 designated to add various sound effects, a D/A converting circuit 36 and an amplifier 37. The wheel mode selection switch 5a is a switch designated to change the control function of wheel switch 10 to pitch bend or vibrato.

The fingering data ROM 29 stores a table which specifies the assignment of the pitch of musical tone to be generated to the key pattern of play keys 7 and 8. The tone color data ROM 32 stores the waveform data of tone colors which can be generated by the tone source unit 1. The program ROM 31 stores a program to control operations of the tone source unit 1. The data ROM 32 stores various musical tone control data. In the RAM 33 a wheel mode flag F and a pitch bend mode register R are set. The wheel mode flag F is used to recognize whether the wheel switch 10 has the pitch bend function (pitch bend mode) or vibrato function (vibrato mode). If this flag is set, it indicates that the current mode is vibrato mode. The pitch bend mode register R is a register designated to set the extent of pitch change (up or down) when the wheel switch 10 is operated to the full. This register stored 0 to 5 numerics. Maximum pitch bend corresponding to each numeric is as follows.

Figure 4A:
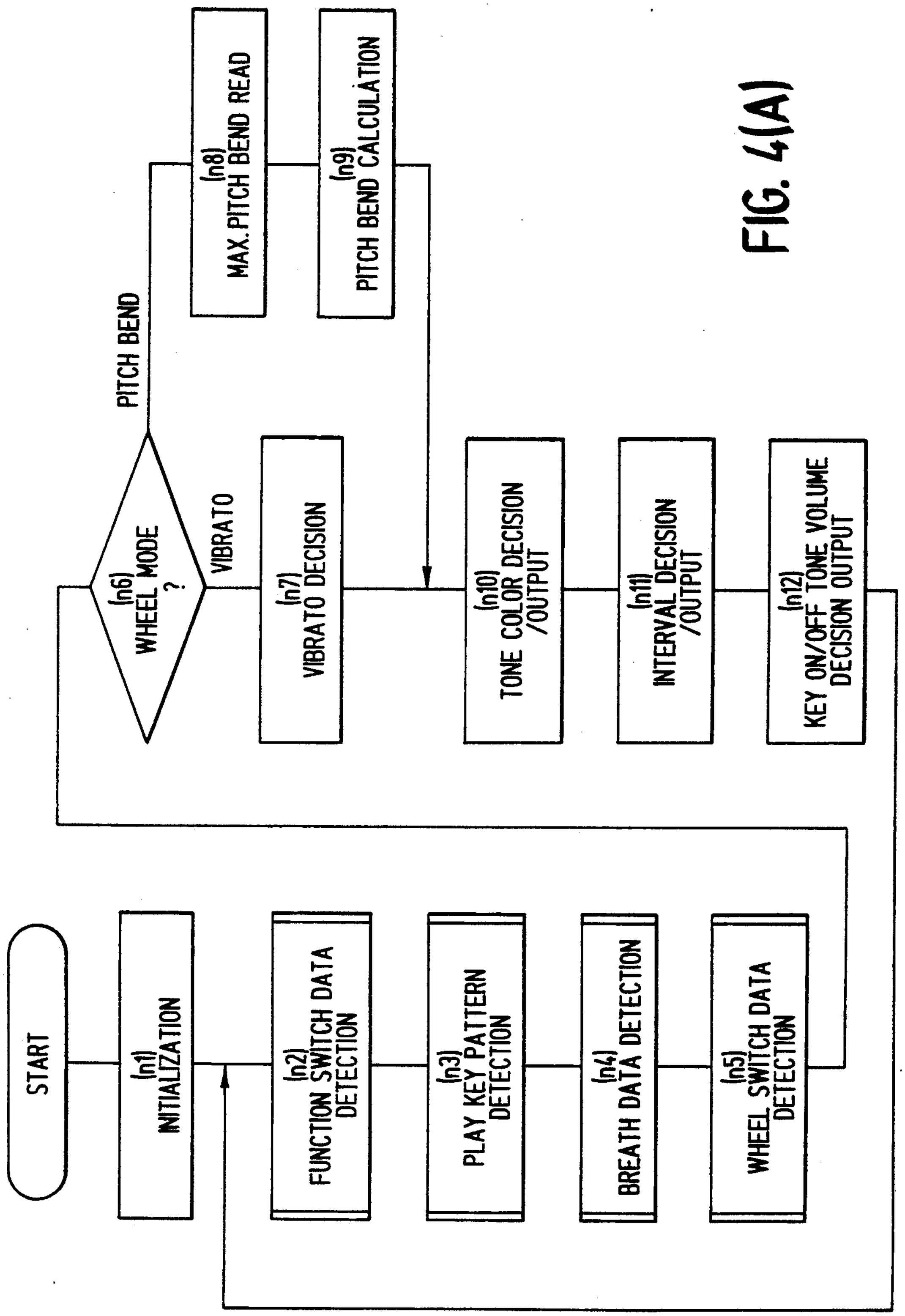
FIGS. 4 (A) and (B) are flow charts showing the operations of the control section.
Figure 4B:
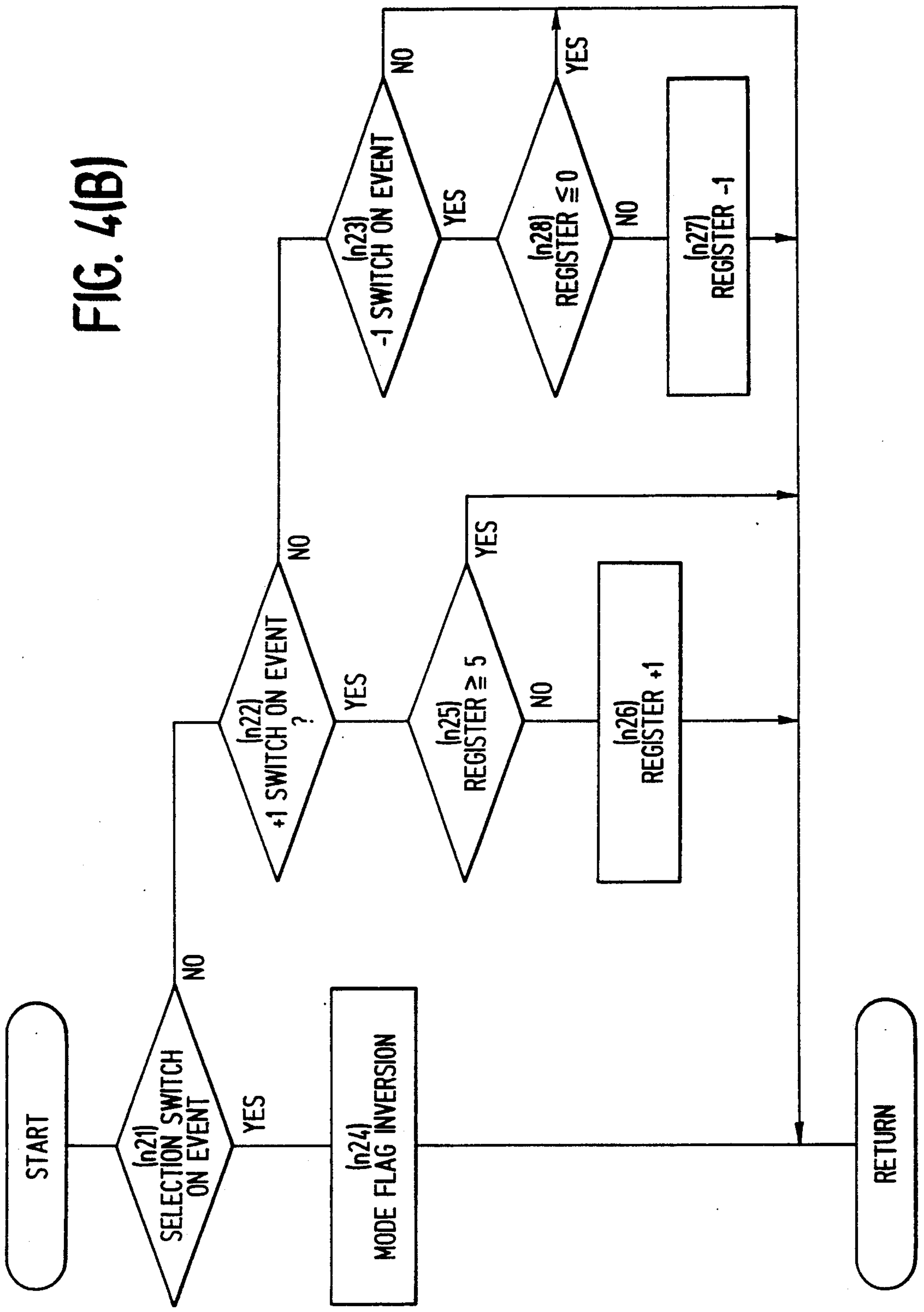

5: Octave up
4: 5-degree up
3: Whole tone up
2: Semitone up
1: Whole tone down
0: Octave down FIGS. 4 (A) and (B) are flow charts showing the operation of the above-mentioned CPU 20. FIG. 4 (A) shows a main routine. FIG. 4 (B) shows a sub-routine which is executed when an ON event of wheel mode selection switch 5a, +1 switch 5b and −1 switch 5c in the main routine is detected.

At first, an explanation of the main routine shown in FIG. 4 (A) is given below. When the power switch of the electronic wind instrument is turned on, its operation is started. At first, at step n1 the initialization of register and flag resetting are performed. As a result of initialization the electronic wind instrument is made playable. Then at step n2 the ON event of function switch is detected. If one of the function switches, namely when mode selection switch 5a, +1 switch 5a or −1 switch 5c, is turned on, the operation shown in FIG. 4 (B) is executed. After this operation ON/OFF state of the pertinent operator provided on the controller 2 is detected (steps n3 to n5). At step n3 the key pattern of the play key is detected. The detected key pattern is compared with the data of the fingering data ROM 29, so that the specified pitch is found. At step n4 the breath data is detected. Based on this data the tone volume level of the musical tone to be generated is determined. Next, the wheel switch data (operation data of wheel switch 10) is detected (n5). After the wheel switch data is detected, the wheel mode flag F is referenced, and vibrato mode/pitch bend mode is judged (n6). In vibrato mode the process proceeds to step n7 where vibrato value is determined according to the wheel switch data, and then the process proceeds to step n10. In pitch bend mode the process proceeds to step n8 where at first the maximum pitch bend value is read from the pitch bend mode register R. Then at step n9 the ratio of current wheel switch data to the wheel switch maximum operation value is normalized with the read maximum pitch bend value, and after the pitch bend value in this state is calculated, the process proceeds to step n10. At step n10 the waveform data of the musical tone to be generated is decided, and is outputted to the tone generator 34. At step n11 the interval of the musical tone to be generated is determined based on the above-mentioned data, and obtained data is outputted to the tone generator 34. Then, key on/off data based on the output of the breath sensor and tone volume is outputted to the tone generator 34 where musical tone is generated.

While the musical instrument is operated, operations of steps n2 to n12 are repeatedly performed. However, if the detected value of the breath sensor 21 is less than a specific value, key-off data is sent to the tone generator 34, so that a musical tone is not generated irrespective of what type of operation is performed.

FIG. 4 (B) shows a sub-routine corresponding to an ON event of some function switches. This operation is executed corresponding to an ON event of wheel mode selection switch 5a, +1 switch 5b and −1 switch 5c. At first, at steps n21 to n23 a judgment as to ON event of what switch occurs is performed. If the wheel mode selection switch 5a is set to ON, the process proceeds from step n21 to step n24, the wheel mode flag F is inverted (n24), and the process returns. Namely, the wheel mode selection switch is a toggle switch which can alternately set the vibrato mode and pitch bend mode by repeating turning-on of this selection switch. In the case when the +1 switch 5b is turned on, the process proceeds from step n22 to step n25 where a judgment as to whether the pitch bend register R is 5 or not is performed. If the register R is 5, there are no numeric values larger than 5. Accordingly, the process returns regardless of the ON event of the switch. If the register R is smaller than 5, 1 is added to the content of register R (n26), and the process returns. If the −1 switch is turned on, the process proceeds from step n23 to step n27 where a judgment as to whether the content of the register is less than 0 or not is performed. If it is less than 0, the process returns. If it is larger than 0, 1 is subtracted from the content of register R (n28), and the process returns. As a result of these operations the setting of maximum pitch bend value can be changed with the aid of +1 switch and −1 switch.

In this embodiment of the invention the pitch bend mode/vibrato mode is assigned to the wheel switch. It is possible to assign other functions to it. It is also possible to select the functions of any operators other than a wheel switch.

Accordingly, the electronic wind instrument of such a composition allows application of operators such as the wheel switch as various musical tone parameter controllers, so that it is possible to make various settings according to the music to be played, thereby making it possible to express a wide range of musical tones. If this setting change (by function switch) can be executed during playing of the musical instrument, it becomes possible to control various musical tone parameters during playing of one music, which greatly enhances the expression capacity of electronic wind instrument.

Figure 5:
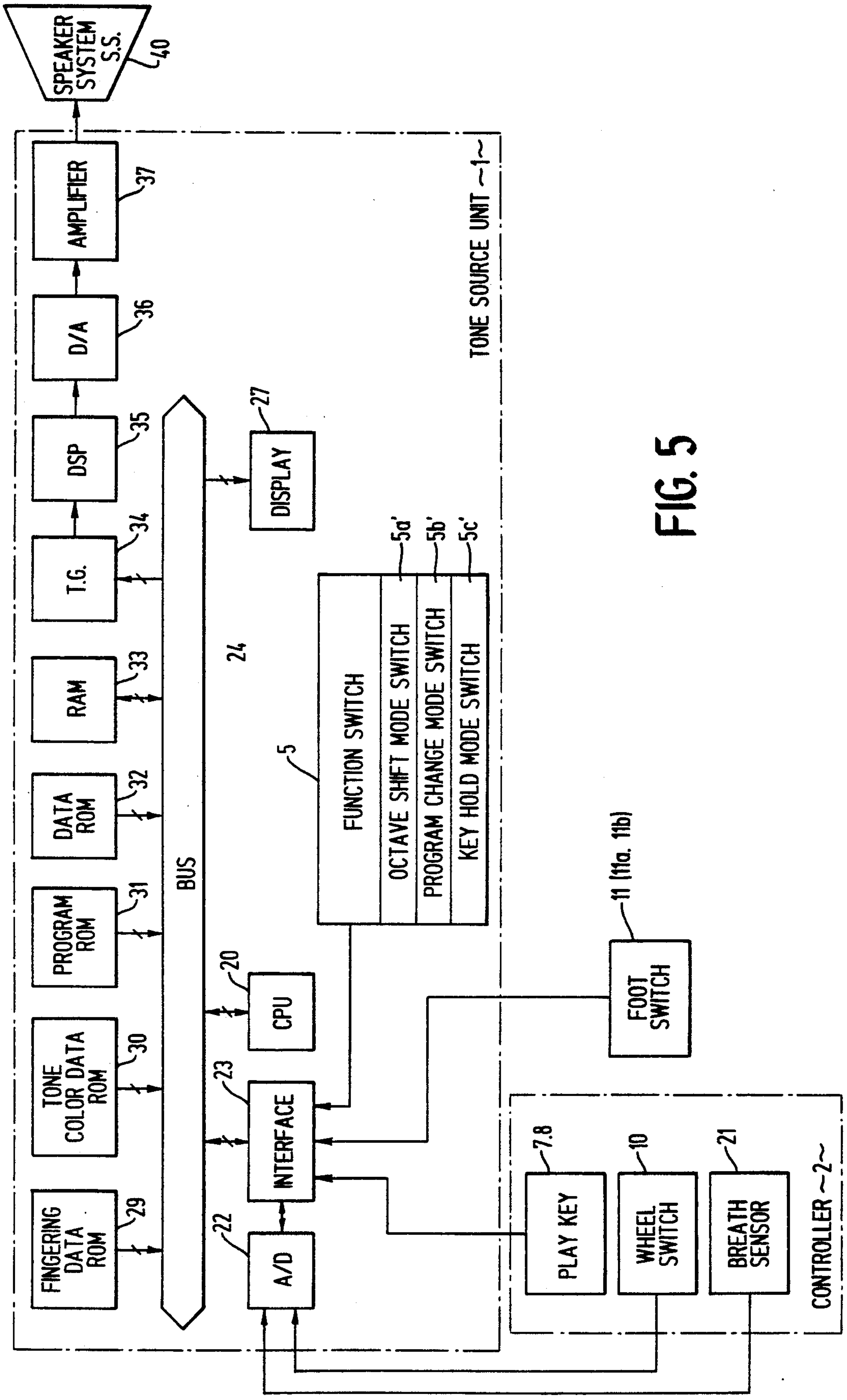
FIG. 5 is a block diagram of the control section of an electronic wind instrument which is another embodiment of this invention.

FIG. 5 is a block diagram showing the control section of electronic wind instrument which is another embodiment of this invention.

The difference in configuration from that of control section shown in FIG. 2 is that there are two foot switches 11, namely foot switch 11a and 11b, and another difference lies in the configuration of function switch 5 and partial configuration of RAM 33. In this embodiment of the invention, the foot switches 11 (11*a*, 11*b*) are operators to which any one of musical playing expression functions is assigned. The function switch 5 executes the assignment.

The function switch 5 includes an octave shift mode switch 5*a*', a program change switch 5*b*' and a key hold mode switch 5*c*'. When these switches are turned on, the pertinent function is set to the foot switches 11*a* and 11*b*.

The functions which are set to the foot switches 11*a* and 11*b* by the function switches 5*a*', 5*b*' and 5*c*' are as follows.

(1) In the case of turning on the octave shift mode switch 5*a*':

When the foot switch 11*a* is turned on, the musical tone being played is raised by one octave. When the foot switch 11*b* is turned on, the musical tone being played is lowered by one octave.

(2) In the case of turning on the program change mode switch 5*b*':

When the foot switch 11*a* or 11*b* is turned on, the program moves forward or backward, respectively, according to the set program order in the memory. One program is composed of a combination of musical tones and effects such as vibrato.

(3) In the case of turning on the key hold mode switch 5*c*':

When the foot switch 11*a* or 11*b* is turned on, the musical tone having a pitch specified by the play key is sustained according to the breath intensity while the foot switches are kept turned on.

Figure 6:
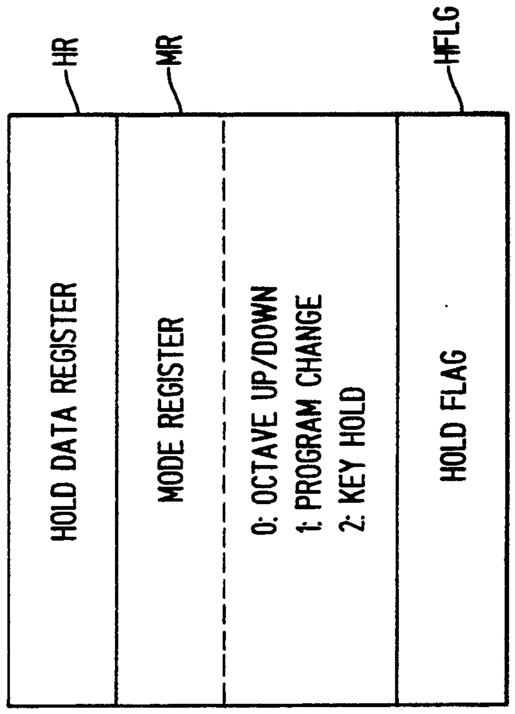
FIG. 6 shows the partial configuration of RAM of the control section.

Hold data register HR, mode register MR, and hold flag HFLG are set in RAM 33 as shown in FIG. 6. The mode register MR is a register to store the function (mode) assigned to the foot switches. While "0" is stored in this register, the current mode is octave shift mode. While "1" is stored, the current mode is program change mode. While "2" is stored, the current mode is key hold mode. The hold data register HR stores the pitch data which must be held (tone generation which must be maintained even when the key pattern is changed) in key hold mode. The hold flag HFLG is a flag to store the ON/OFF state of the foot switch in key hold mode.

Figure 7C:
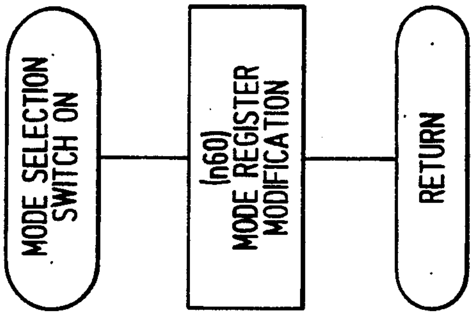
Figure 7B:
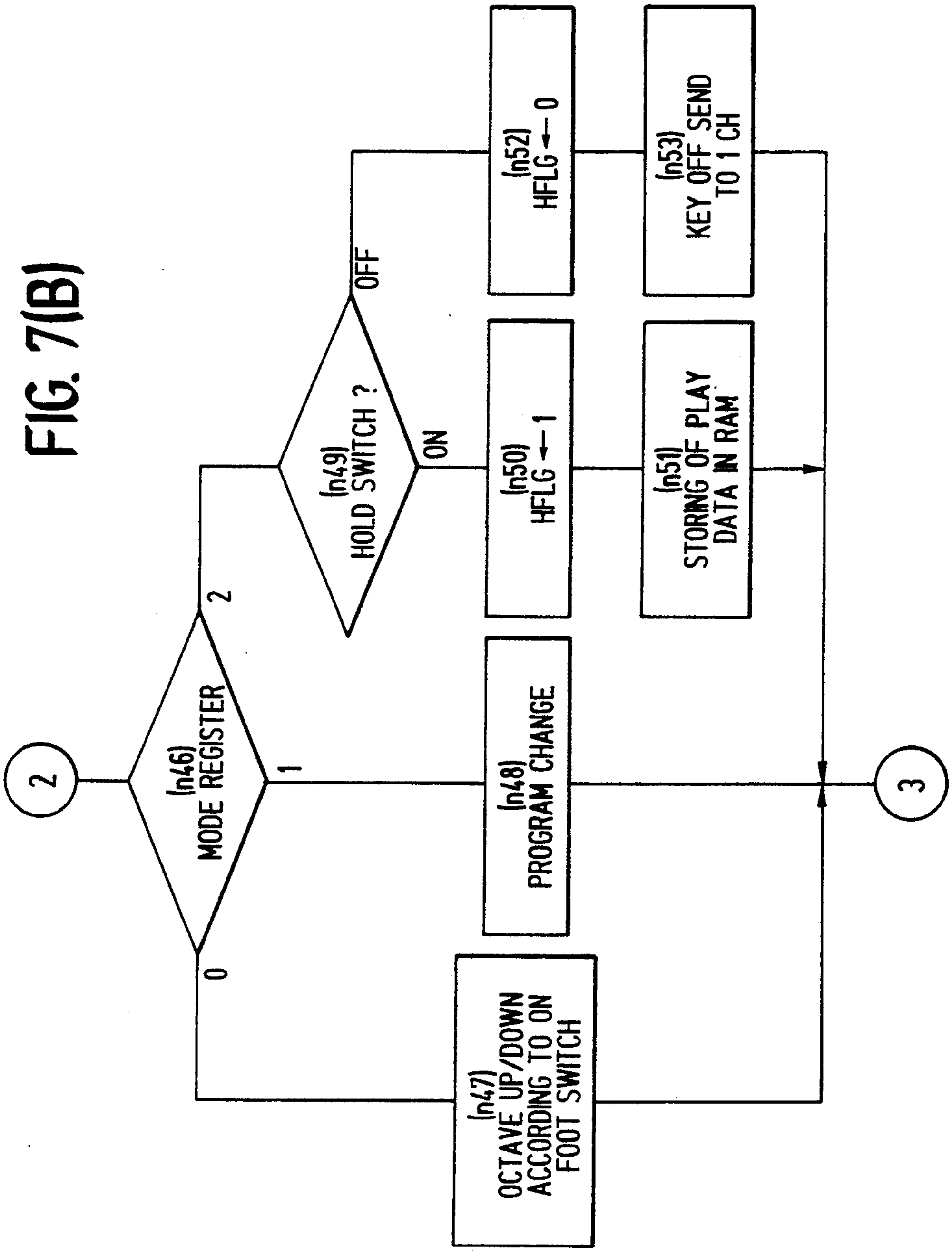

FIGS. 7(A)-1, 7(A)-2, 7(B) and 7(C) are flow charts showing the operation of CPU 20. FIGS. 7(A)-1, 7(A)-2, and (B) show a main routine, whereas FIG. 7(C) is a flow chart showing the operation when the function switches 5*a*', 5*b*' or 5*c*' are turned on.

At first, an explanation of the main routine shown in FIGS. 7(A)-1, 7(A)-2, and (B) is given below. When the power switch of this electronic wind instrument is turned on, this operation is started. At step n31 initialization of register and flag reset are performed. Initialization makes it possible to play the electronic wind instrument. Then at step n32 the ON event of function switch is detected. When one of the function switches, namely octave shift mode switch 5*a*', program change switch 5*b*' and key hold mode switch 5*c*', is turned on, the operation shown in FIG. 7(C) is executed. Following this operation, ON/OFF state of each operator provided on the controller 2 is detected (n33 to n37). At step n33 the key pattern of play key is detected. If the detected key pattern differs from the preceding key pattern, it is judged that the pitch has been changed (namely event ON), and the process proceeds from step n34 to n35 where the pitch deduced from this key pattern is assigned to the specified channel namely channel 0. At step n36 the breath data is detected. Tone volume level of the musical tone to be generated is decided based on this data. Next, wheel switch data (control data of wheel switch 10) is detected (n35). Wheel switch data is used for control of pitch bend and vibrato. After that, a judgment as to whether the foot switch 11*a* or 11*b* was operated or not is executed. If any foot switch operation was done, the operation of step n46 and after steps are executed, and then the process proceeds to step n39. If the foot switch 11*a* or 11*b* was not operated, the process proceeds directly to step n39 from step n38.

At step n39 the tone color waveform data of the musical tone to be generated is decided (n39), the interval of musical tone to be generated is decided based on the above-mentioned data (n40), and key ON/OFF data and tone volume data are decided based on output of breath sensor 21 (n41). At step n42 the hold flag HFLG is judged (n42). If it has been set, the data of hold data register HR is sent to the channel 1 (a channel which is assigned to generate hold tone) (n43). The musical tone data decided by the operations of steps n39 to n41 is sent to a tone generator 34 to generate a tone (n44). Mode of foot switch is displayed on the indicator 27 (n45), then the process returns to step n32 to repeat the same operations.

If at step n38 operation of foot switch has been detected, data of mode register is judged at step n46. If it is "0", the current mode is octave shift mode. Consequently, the musical tone is raised or lowered an octave according to turn on foot switch 11*a* or 11*b* (n47). If the mode register is "1", the current mode is program change mode. Therefore the previously set program is read and set in the tone generator (n48). If the mode register is "2", the current mode is key hold mode. Therefore ON/OFF of hold switch is detected at step n49. If it is an ON event, the hold flag HFLG is set (n50), and pertinent play data is stored in the hold data register HR (n51). If it is an OFF event, the hold flag HFLG is reset (n52), and key OFF signal is sent to the channel 1 which is generating hold tone (n53). After completion of pertinent operation the process proceeds to step n39.

FIG. 7 (C) shows a subroutine which is executed in case of the function switch ON event. If one of function switches, namely mode selection switches (octave shift mode switch 5*a*', program change switch 5*b*' and key hold mode switch 5*c*'), is turned on, this operation is executed. Value 0, 1, or 2 corresponding to turned on key is set in the mode register (n60), and then the process returns. In this embodiment of the invention two tone generation circuits (channels 0 and 1) are provided, the musical tone corresponding to the key pattern is generated in the channel 0 whereas key hold tone is generated in the channel 1. It is also possible to provide more tone generation channels than this embodiment in the tone generator and to allow any tone generation channel to be set or to make many channels generate tones at the same time.

The electronic wind instrument having the above-mentioned configuration ensures diversified musical expressions by selecting proper musical play expression functions according to the music to be played since the player can assign the most proper one among many musical play expression functions to one of operators (foot switch, etc.). Moreover, since functions can be selected during playing, the atmosphere of the same music can be changed while it is played, thereby variegating the musical expression.

Figure 8:
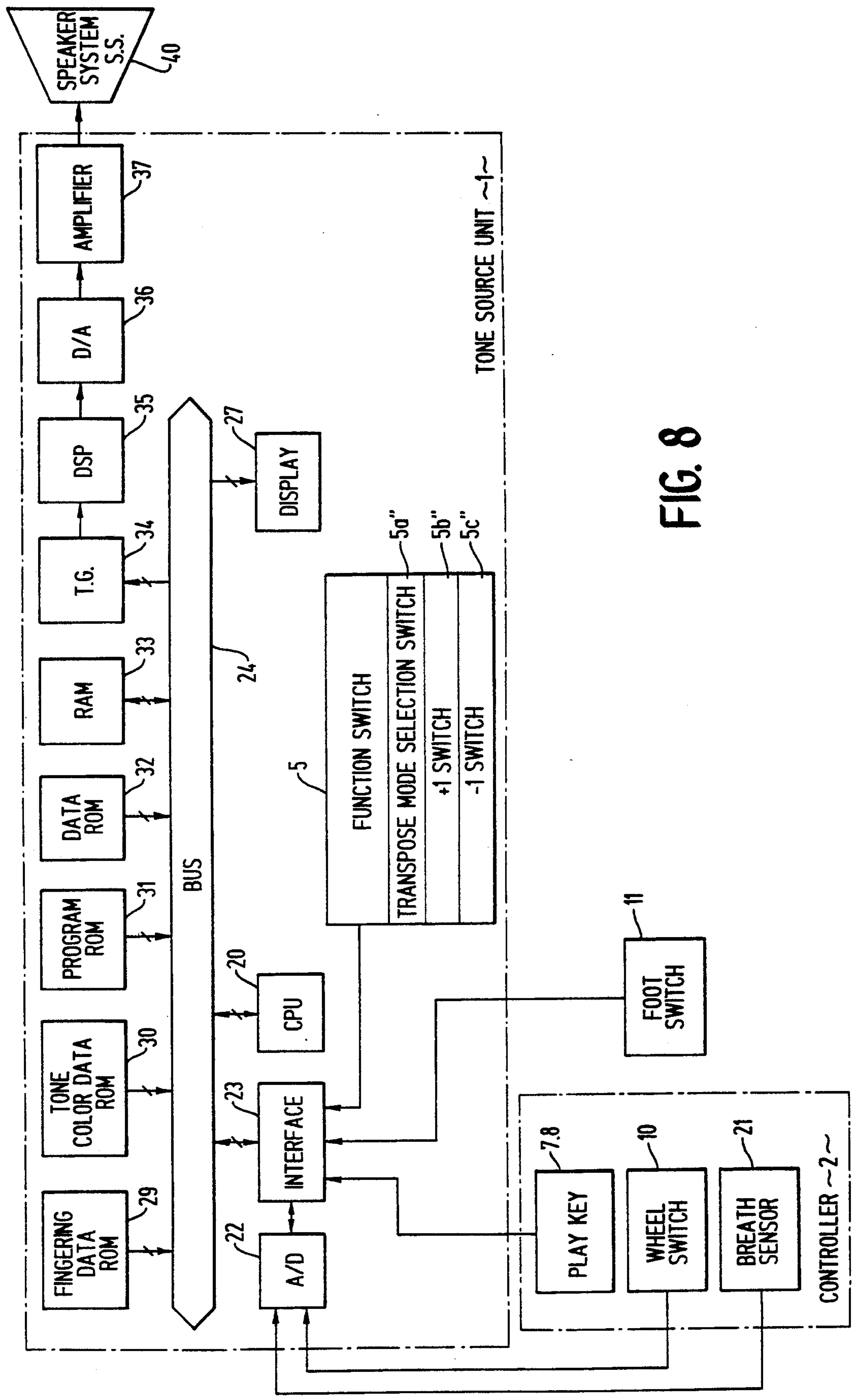
FIG. 8 is a block diagram of the control section of an electronic wind instrument which is the third embodiment of this invention.

FIG. 8 is a block diagram of the control section of electronic wind instrument which is also another embodiment of this invention.

The major difference between the control section shown in FIG. 2 and the control section shown in FIG. 8 lies in the composition of function switch 5 and the composition of a part of RAM 33.

The function switch 5 includes a transpose mode selection switch 5*a*'', a +1 switch 5*b*'', a −1 switch 5*c*'', and a tone color setting switch. The transpose mode selection switch 5*a*'' is a switch to select by-5-degree transposition or by-semitone transposition with the aid of +1 switch 5*b*'' or −1 switch 5*c*''.

Figure 9:
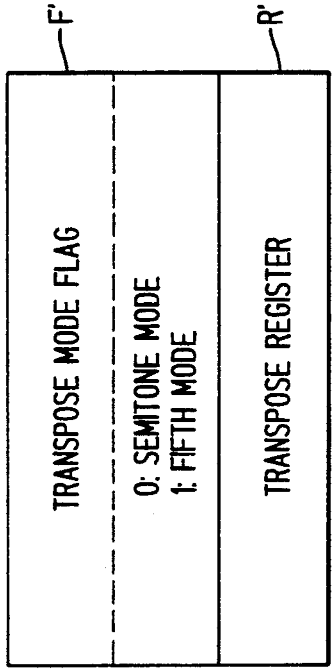
FIG. 9 shows a partial configuration of RAM of the control section.
Figure 10B:
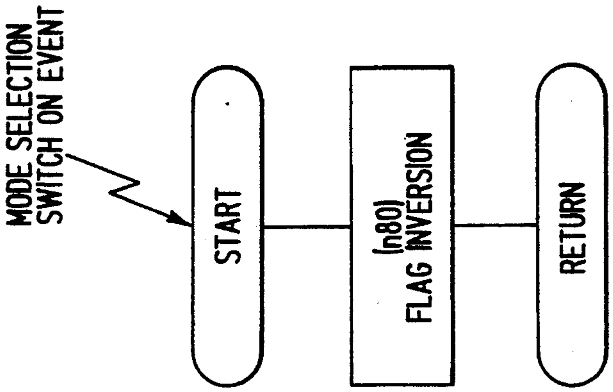
FIGS. 10 (A) to (D) are flow charts showing the operations of the control section.
Figure 10A:
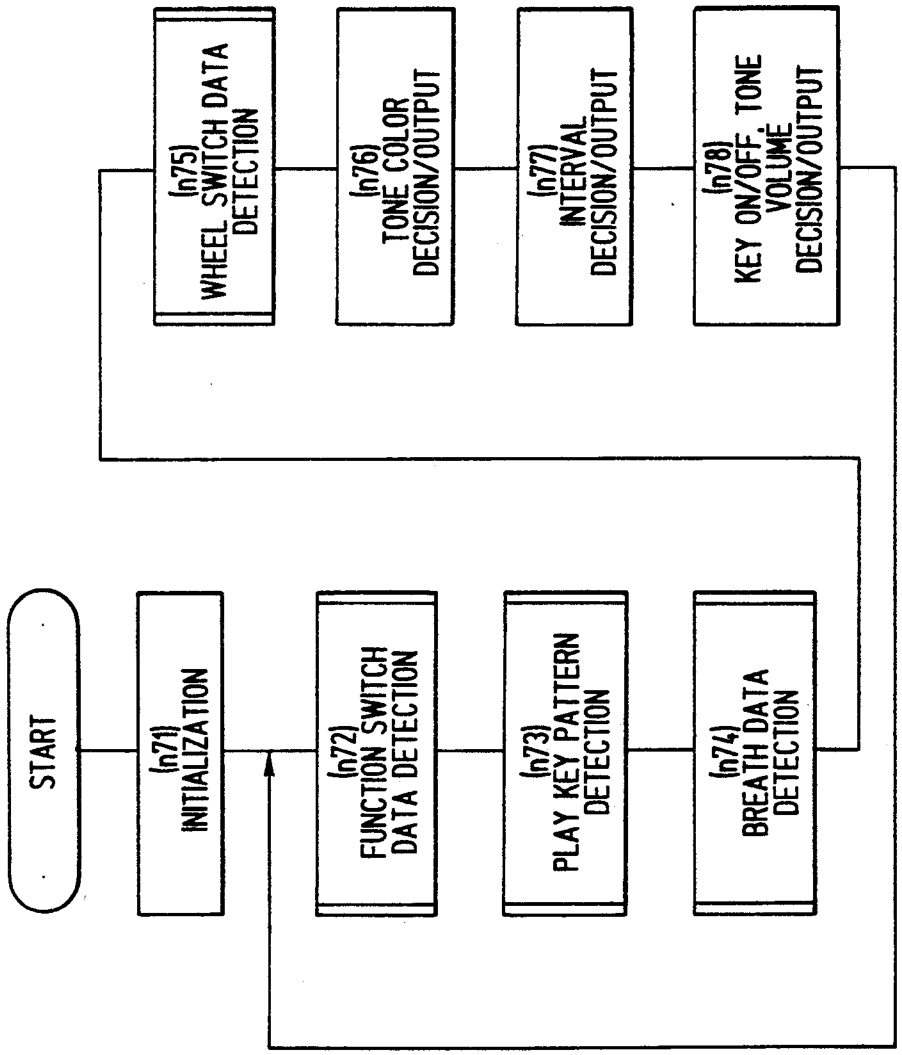
Figure 10C:
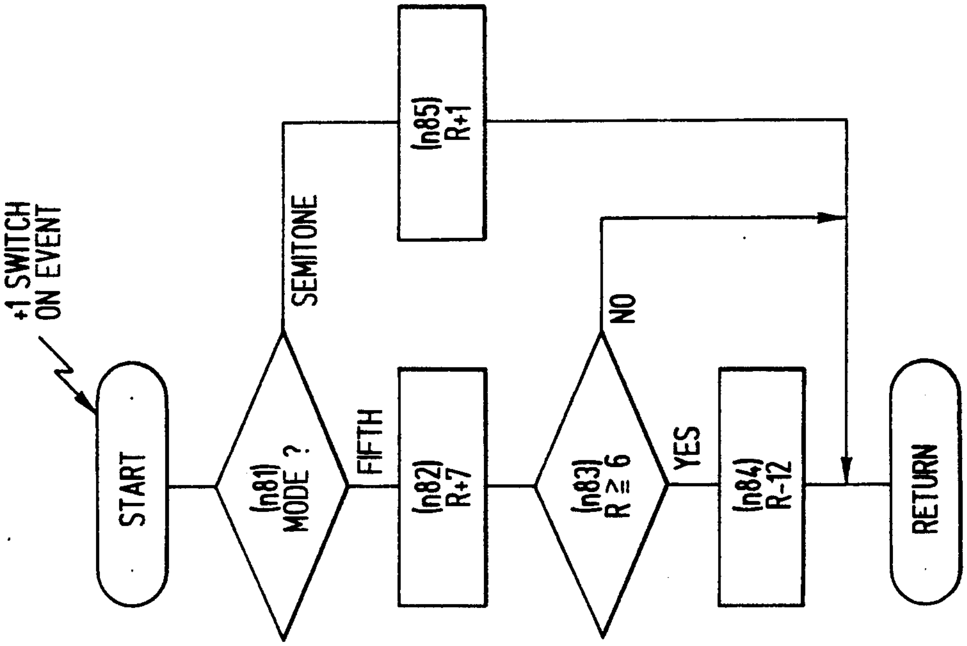
Figure 10D:
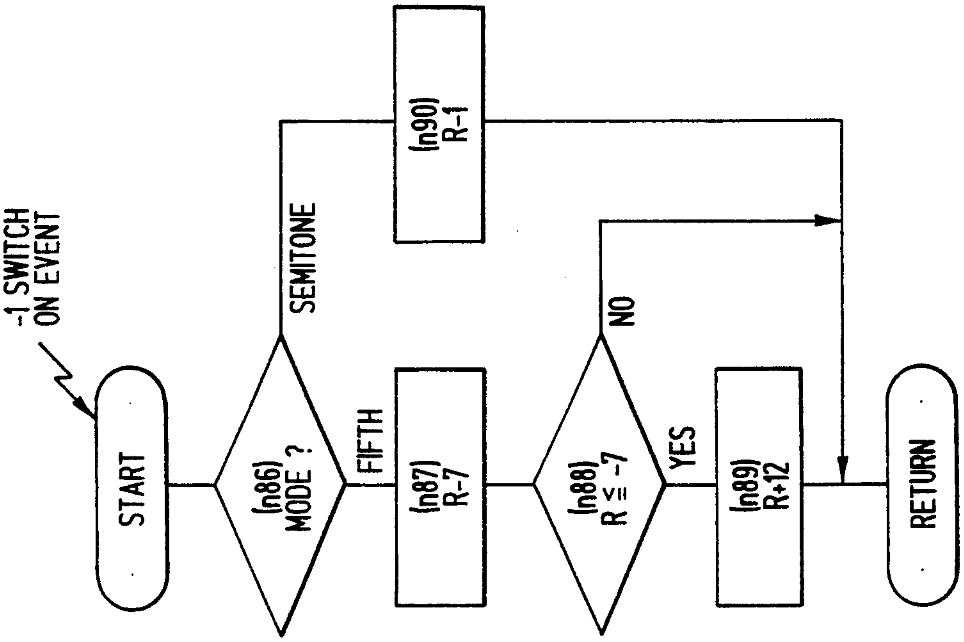

A transpose mode flag F' and a transpose register R' are set in the RAM 33 as shown in FIG. 9. The transpose mode flag F' is set or reset when the transpose mode selection switch 5*a*'' is set to ON. While this flag is set, by-5-degree transposition mode (fifth mode) is set. While it is reset, by-semitone transposition mode (semitone mode) is set. The transpose register R' is a register to store the transpose value. Final pitch is decided by adding or subtracting this transpose value to or from the pitch which is set according to the key pattern (fingering).

FIGS. 10 (A) to (D) are flow charts showing the operation of CPU 20. FIG. 10 (A) shows a main routine. FIGS. 10 (B) to (D) show a subroutine which is executed when the mode selection switch 5*a*'', +1 switch 5*b*'' or −1 switch 5*c*'' is set to ON, respectively.

At first, the main routine shown in FIG. 10 (A) is explained below. When the power switch of the electronic wind instrument is turned on, the main routine is started. At step n71 initialization of register and flag reset are executed. At this time 0 is set in the transpose register R'. As a result of this initialization the electronic wind instrument becomes operable. Next, at step n72 the ON event of the function switch is detected. When one of function switches, namely transpose mode selection switch 5*a*'', +1 switch 5*b*'' or −1 switch 5*c*'', is set to ON, the operation shown in FIGS. 10 (B) to (D) is executed. After this operation, ON/OFF state of pertinent operator provided in the controller 2 and the operation state are detected (n73 to n75). At step n73 the key pattern of the play key is detected. The key pattern detected by this operation is compared with the data of fingering data ROM 29, so that the specified pitch is found. At step n74 the breath data is detected. Volume level of the musical tone to be generated is determined based on this data. Next, wheel switch data (wheel switch 10 control data) is detected (n75). The wheel switch data is used for control of pitch bend and vibrato. After that, the tone color waveform data of the musical tone to be generated is decided and outputted to a tone generator 34 (n76), and the interval of the musical tone to be generated is decided based on the above-mentioned data and outputted to a tone generator 11 (n77). After key ON/OFF data based on output of breath sensor 21 and tone volume is outputted to the tone generator 34, the process returns to step n72.

During operation of this musical instrument the operation of steps n72 to n78 is repeatedly executed. If the detected value of breath sensor 21 is lower than a specific value, key OFF data is sent to the tone generator 34. Therefore a musical tone is not generated irrespective of what operation is performed.

FIG. 10 (B) shows the operation when the transpose mode selection switch 5*a*'' is set to ON. When the transpose mode selection switch 5*a*'' is set to ON, the transpose mode flag F' is inverted (n80), and the process returns. Accordingly, the transpose mode selection switch 5*a*'' is a toggle switch which can set alternately fifth mode and semitone mode by repeatedly setting it to ON.

FIG. 10 (C) shows an operation when the +1 switch 5*b*'' is set to ON. If the +1 switch 5*b*'' is set to ON, at first the transpose mode flag F' is referenced to judge whether the current mode is fifth mode or semitone mode (n81). If the current mode is fifth mode, 7 (semitone number of fifth) is added to the transpose register R' to raise the fundamental tone by 5 degrees (n82). Then a judgment as to whether or not the transpose value exceeds 6 is performed (n83). If it exceeds 6, the scale is higher than the initial scale (R=0) by more than ½ octave. Therefore an octave-down (−12) shift is executed (n84) to restrict rising of compass. As a result of this operation (5-degree up and 1 octave down) the fundamental tone is lowered by 4 degrees. After that the process returns. If the current mode is semitone mode, the process proceeds from n81 to n85, 1 is added to the transpose register, and then the process returns.

FIG. 10 (D) shows an operation when the −1 switch 5*c*'' is set to ON. When the −1 switch 5*c*'' is set to ON, at first the transpose mode flag F' is referenced to judge as to whether or not the current mode is fifth mode or semitone mode is executed (n86). If the current mode is fifth mode, 7 is subtracted from the transpose register R' to lower the fundamental tone by 5 degrees (n87). Then a judgment as to whether or not the transpose value is lower than −7 is executed (n88). If it is lower than −7, the scale is lower than the initial scale by more than ½ octave. Therefore so as to restrict lowering of compass an octave-up (+12) shift is executed (n89). As a result of this operation the fundamental tone is raised by 4 degrees. After that the process returns. If the current mode is semitone mode, the process proceeds from n86 to n90, and 1 is subtracted from the transpose tone register. Then the process returns.

With the electronic wind instrument having such a composition, scale moves up or down by 5 degrees whenever transposition is executed. Therefore quick transposition corresponding to real the scale of the musical instrument is possible, player's operation is easy, and playing with quick transposition can be easily done. Moreover, transposition can be executed without excessively upward or downward deviation of scale, which makes play easier. Since by-5-degree transposition and ordinary semitone transposition are enabled, any transposition can be quickly realized.

What is claimed is:

1. An electronic musical instrument, comprising:

a controller having first and second opposed sides, said controller including a plurality of playing keys configured on the first side, said controller being adapted to be held by both hands of a player and such that the mouth contacts a part of said controller;

a tone source unit including means for generating a musical tone signal which generates a musical tone signal based on a playing operation of said playing keys;

a continuously adjustable operator which is provided on said second side of said controller, separately from said playing keys; and a function switch for selecting a function to be assigned to said operator, wherein said function is control of one of a plurality of musical tone parameters and wherein said musical tone parameters include pitch bend and vibrato.

2. The electronic musical instrument according to claim 1, wherein said operator is a wheel switch.

3. The electronic musical instrument according to claim 1, wherein said function switch selects control of a musical play expression as a function to be assigned to said operator.

4. The electronic musical instrument according to claim 3, wherein said operator is foot switch.

5. An electronic musical instrument, comprising:

a controller provided with playing keys, adapted to be held by both hands of a player and such that the player's mouth contacts a part of said controller;

a tone source unit, including means for generating a musical tone signal, which generates a musical tone signal based on a playing operation of said playing keys;

an operator which is provided separately from said playing keys;

a function switch for selecting a function to be assigned to said operator, wherein said function switch selects between a first transpose function for transposing up with a 5 degree step and a second transpose function for transposing down with a 5 degree step; and means for performing an octave shift to within a range of a half-octave from a predetermined reference scale when operation of said selected transpose function causes a total transposition of more than a half-octave.

6. An electronic musical instrument, comprising:

a controller provided with playing keys, adapted to be held by both hands of a player and such that the player's mouth contacts a part of said controller;

a tone source unit, including means for generating a musical tone signal, which generates a musical tone signal based on a playing operation of said playing keys;

an operator which is provided separately from said playing keys;

a function switch for selecting a function to be assigned to said operator, wherein said function switch selects among a first transpose function for transposing up with a 5 degree step, a second transpose function for transposing down with a 5 degree step, a third transpose function for transposing up with a semitone step, and a fourth transpose function for transposing down with a semitone step from said reference scale; and means for performing an octave shift to within a range of a half-octave from a predetermined reference scale when operation of said selected transpose function causes a total transposition of more than a half-octave.

7. An electronic musical instrument comprising:

a controller, having a plurality of playing keys, and adapted to be held by both hands of a player such that the player's mouth contacts a part of said controller;

tone generating means for generating a musical tone signal based on a playing operation of said playing keys;

operating means provided separately from said playing keys; and switching means for selecting between a first transpose function for transposing up a scale in a 5 degree step from the present scale and second transpose function for transposing down a scale in a 5 degree step from the present scale.

8. The electronic musical instrument according to claim 7, further comprising shifting means for shifting the scale with an octave step.

9. The electronic musical instrument according to claim 8, further comprising comparing means for detecting the difference between a reference scale and the scale to be transposed and, wherein the shifting means shifts a scale to be transposed within a predetermined range to settle the difference between the reference scale and the scale to be transposed as detected by the comparing means.

10. The electronic musical instrument according to claim 7, further comprising means for performing an octave shift toward the tonic of a predetermined reference scale when operation of the selected transpose function causes a transposed scale having a tonic greater than a half-octave from the tonic of the reference scale.

11. The electronic musical instrument according to claim 9, wherein the predetermined range is a half-octave from the tonic of an initial scale.

12. An electronic musical instrument, comprising:

a controller, having a plurality of keys and adapted to be held by both hands of a player such that the player's mouth contacts a part of said controller;

tone generating means for generating a musical tone signal based on operation of said playing keys;

operating means, provided separately from said playing keys; and transposing means for transposing a scale with a 5 degree step from the present scale in response to an operation of said operation means.

13. The electronic musical instrument according to claim 10, further comprising:

comparing means for comparing an initial scale with a scale to be transposed; and shifting means for shifting a scale with an octave step within a predetermined range to settle the difference between the initial scale and the scale to be transposed detected by the comparing means.

14. The electronic musical instrument according to claim 11, wherein the predetermined range is a half octave from a reference scale.

* * * * *